(12) United States Patent
Chmaytelli et al.

(10) Patent No.: US 8,468,261 B2
(45) Date of Patent: *Jun. 18, 2013

(54) CONTENT PROTECTION IN A WIRELESS NETWORK

(75) Inventors: Mazen Chmaytelli, San Diego, CA (US); Laurence Lundblade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/733,581

(22) Filed: Apr. 10, 2007

(65) Prior Publication Data

US 2007/0180111 A1 Aug. 2, 2007

Related U.S. Application Data

(63) Continuation of application No. 10/660,037, filed on Sep. 10, 2003, now Pat. No. 7,203,967.

(51) Int. Cl.
*G06F 15/16* (2006.01)
(52) U.S. Cl.
USPC ............................ 709/229; 709/223; 709/225
(58) Field of Classification Search
USPC .............. 709/203, 223, 225, 229, 232; 726/2, 726/3, 27, 33
See application file for complete search history.

(56) References Cited

U.S. PATENT DOCUMENTS

| | | | |
|---|---|---|---|
| 4,055,746 A | | 10/1977 | Peterson |
| 5,734,719 A | | 3/1998 | Tsevdos et al. |
| 5,778,304 A | * | 7/1998 | Grube et al. ................. 455/450 |
| 5,790,074 A | * | 8/1998 | Rangedahl et al. ...... 342/357.13 |
| 5,852,810 A | | 12/1998 | Sotiroff et al. |
| 6,289,455 B1 | | 9/2001 | Kocher et al. |
| 6,370,629 B1 | * | 4/2002 | Hastings et al. ............. 713/189 |
| 6,389,402 B1 | | 5/2002 | Ginter et al. |

(Continued)

FOREIGN PATENT DOCUMENTS

| EP | 0769751 A1 | 4/1997 |
|---|---|---|
| EP | 0997808 A2 | 5/2000 |

(Continued)

OTHER PUBLICATIONS

International Search Report—PCT/US04/27051—ISA/US—Alexandria, Virginia—Feb. 6, 2006.

(Continued)

*Primary Examiner* — Ramy M Osman
(74) *Attorney, Agent, or Firm* — Fariba Yadegar-Bandari

(57) ABSTRACT

A method for operating a device to protect an application from unauthorized operation is provided. The application will fail to operate on the device when the device is defined outside a selected operating region. The method includes transmitting the selected operating region for the application, and receiving the application and a geographic identifier associated with the application. The geographic identifier is configured to identify the selected operating region wherein the application will operate on the device. The method further includes transmitting a request to execute the application on the device. The request includes the geographic identifier. Further included in the method is receiving a code. The code prevents an execution of the application on the device if the code is a disable code. The disable code indicates that the device is operating outside the selected operating region. An apparatus for content protection in a wireless network is also provided.

38 Claims, 4 Drawing Sheets

U.S. PATENT DOCUMENTS

| | | | |
|---|---|---|---|
| 6,519,571 | B1 | 2/2003 | Guheen et al. |
| 6,571,221 | B1 | 5/2003 | Stewart et al. |
| 6,650,894 | B1 | 11/2003 | Berstis et al. |
| 6,983,139 | B2 | 1/2006 | Dowling et al. |
| 7,080,402 | B2 | 7/2006 | Bates et al. |
| 7,188,085 | B2 | 3/2007 | Pelletier |
| 7,203,967 | B2 * | 4/2007 | Chmaytelli et al. ............ 726/30 |
| 7,222,359 | B2 * | 5/2007 | Freund et al. ..................... 726/3 |
| 7,269,732 | B2 * | 9/2007 | Kilian-Kehr .................. 709/225 |
| 7,308,703 | B2 * | 12/2007 | Wright et al. ................... 726/11 |
| 7,373,657 | B2 * | 5/2008 | Walker .......................... 709/203 |
| 7,450,930 | B2 | 11/2008 | Williams et al. |
| 7,490,763 | B2 * | 2/2009 | Keohane et al. .................. 726/2 |
| 2002/0017977 | A1 * | 2/2002 | Wall ............................. 340/5.28 |
| 2002/0055924 | A1 | 5/2002 | Liming |
| 2002/0138632 | A1 * | 9/2002 | Bade et al. .................... 709/229 |
| 2002/0188842 | A1 * | 12/2002 | Willeby ........................ 713/154 |
| 2003/0041167 | A1 * | 2/2003 | French et al. ................. 709/225 |
| 2003/0061132 | A1 | 3/2003 | Yu, Sr. et al. |
| 2004/0111640 | A1 * | 6/2004 | Baum ........................... 709/224 |
| 2004/0248653 | A1 * | 12/2004 | Barros et al. .................... 463/43 |
| 2005/0266857 | A1 * | 12/2005 | Poikela ...................... 455/456.3 |
| 2006/0059096 | A1 | 3/2006 | Dublish et al. |
| 2006/0059561 | A1 | 3/2006 | Ronning et al. |
| 2006/0223494 | A1 | 10/2006 | Chmaytelli et al. |
| 2006/0277312 | A1 | 12/2006 | Hirsch |
| 2007/0162390 | A1 | 7/2007 | Pancholy et al. |
| 2007/0250536 | A1 | 10/2007 | Tanaka et al. |
| 2009/0183264 | A1 | 7/2009 | Chmaytelli et al. |

FOREIGN PATENT DOCUMENTS

| | | | |
|---|---|---|---|
| EP | 1331543 | A2 | 7/2003 |
| JP | 2000011538 | A | 1/2000 |
| JP | 2000293439 | A | 10/2000 |
| JP | 2003223449 | | 8/2003 |
| JP | 2004157784 | A | 6/2004 |
| JP | 2005267353 | A | 9/2005 |
| JP | 2006085718 | A | 3/2006 |
| JP | 2006209161 | A | 8/2006 |
| JP | 2007533037 | A | 11/2007 |
| JP | 2008532174 | A | 8/2008 |
| KR | 20000061704 | A | 10/2000 |
| WO | WO9635186 | A1 | 11/1996 |
| WO | WO0191479 | A2 | 11/2001 |
| WO | WO03017053 | | 2/2003 |
| WO | WO03102736 | A2 | 12/2003 |
| WO | 2005064484 | A1 | 7/2005 |
| WO | 2006022304 | A1 | 3/2006 |
| WO | WO2006109955 | | 10/2006 |
| WO | WO2007148212 | | 12/2007 |

OTHER PUBLICATIONS

Written Opinion—PCT/US04/27051—ISA/US—Alexandria, Virginia—Feb. 6, 2006.

International Preliminary Examination Report—PCT/US04/27051, IPEA/US—Alexandria, Virginia—May 12, 2006.

Anonymous, "Methodology to Prevent Video and Software Piracy, New York, US, XP002064759 ISSN:0018-8689," IBM Technical Disclosure Bulletin, IBM Corp, 1993, 36 (10), 199-200.

Supplementary European Search Report—EP04781683, Search Authority Munich, May 20, 2009.

Andreas U. Schmidt: "On the Superdistribution of Digital Goods" Arxiv.Org, [Online] Jun. 9, 2008, XP002544447 Retrieved from the Internet: URL:http://arxi v.org/PS_cache/arxi v/pdf/08 06/0806.1543vl.pdf> [retrieved on Sep. 4, 2009].

Bohyun Wang et al: "A Study of Superdistribution Model for Family Domain in DRM System" Computational Science and Its Applications, 2007. ICCSA 2007. International Conference on, IEEE, Piscataway, NJ, USA, Aug. 1, 2007, pp. 133-138, XP031133954 ISBN: 978-0-7695-2945-5 Abstract Sections 2, 3, 4.

Indrakshi Ray et al: "LRBAC: A Location-Aware Role-Based Access Control Model" Information Systems Security Lecture Notes in Computer Science;;LNCS, Springer, Berlin, DE, vol. 4332, Jan. 1, 2006, pp. 147-161, XP019053330 ISBN: 978-3-540-68962-1 Abstract Figure 1.

Ulrich Greveler Ed-Reihaneh Safavi-Naini et al: "Enforcing Regional DRM for Multimedia Broadcasts With and Without Trusted Computing" Digital Rights Management. Technologies, Issues, Challenges and System S Lecture Notes in Computer Science;;LNCS, Springer, Berlin, DE, vol. 3919, Jan. 1, 2006, pp. 332-340, XP019036840 ISBN: 978-3-540-35998-2 Abstract Sections 1 and 2.

* cited by examiner

CONTENT PROTECTION IN A WIRELESS NETWORK

CROSS-REFERENCE TO RELATED APPLICATIONS

The subject application is a continuation of U.S. patent application entitled "METHODS AND APPARATUS FOR CONTENT PROTECTION IN A WIRELESS NETWORK," filed on Sep. 10, 2003, having U.S. application Ser. No. 10/660,037. This application is incorporated herein by reference.

BACKGROUND

I. Field

The present invention relates generally to the operation of data networks, and more particularly, to methods and apparatus for protecting content in a wireless data network.

II. Description of the Related Art

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One example where there is an increasing demand for network resources is in wireless network environments. In wireless environments, a variety of wireless devices, such as wireless telephones, personal digital assistants (PDAs), and paging devices, communicate over a wireless network. The wireless network may also include network servers that operate to provide various network resources to the wireless devices. Furthermore, the wireless networks may also be coupled to a public network, such as the Internet, so that resources on the public network can be made available to the wireless devices on the wireless network.

One area of concern for application and content developers is that of content protection. Content protection is becoming very important in wireless networks due to the improvements in air-link data speeds and the proliferation of end-users purchasing applications and related content via wireless devices. For example, applications and content purchased by one device user can be easily distributed to other device users. As a result, it is possible for device users to avoid paying various purchase and license fees to application and content developers. Thus, application developers and content providers must address the problem of having their applications or content pirated and/or distributed to other wireless devices or desktop computers without receiving the associated fees.

Therefore, what is needed is a system that operates to protect applications and content from unauthorized acquisition, operation, and/or distribution.

SUMMARY

Methods and apparatus for content protection in a wireless network are provided. In one embodiment, an application or content distribution server (server) is operable to limit the purchaser of the application and/or content to operate within a predefined geographic location. Once the purchaser's device is outside the predefined location, the application or content will not be accessible from the server. In one embodiment, the server operates to flag "high value" applications and/or content for usage restriction within a predefined geographic region. Thus, the application and/or content are provided with a geographic privilege that can be based on any one of a variety of geographic identifiers. For example, the geographic privilege can be based on a global positioning system (GPS) location, a base station location, a system identifier (SID), a network identifier (NID), an area code, or other geographic identifier.

Once the geographic privilege is enabled upon the application and/or content download, the end-user is restricted to running the application or viewing the content only within the region identified by the geographic identifier. Thus, the application and/or content are protected from unauthorized acquisition, operation, or distribution because the application and/or content are only available within predetermined regions and therefore cannot be used by devices that are outside the region.

In one embodiment, a method for operating a device to protect an application from unauthorized operation is provided. The application will fail to operate on the device when the device is defined outside a selected operating region. The method includes transmitting the selected operating region for the application, and receiving the application and a geographic identifier associated with the application. The geographic identifier is configured to identify the selected operating region wherein the application will operate on the device. The method further includes transmitting a request to execute the application on the device. The request includes the geographic identifier. Further included in the method is receiving a code. The code prevents an execution of the application on the device if the code is defined as a disable code. The disable code indicates that the device is operating outside the selected operating region.

In another embodiment, a device operable to protect an application from unauthorized operation is provided. The application will fail to operate on the device when the device is defined outside a selected operating region. The device includes logic configured to transmit the selected operating region for the application, and logic configured to receive the application and a geographic identifier associated with the application. The geographic identifier is configured to identify the selected operating region wherein the application will operate on the device. The device also includes logic configured to transmit a request to execute the application on the device. The request includes the geographic identifier. The device also includes logic configured to receive a code which prevents an execution of the application on the device if the code is defined as a disable code. The disable code indicates that the device is operating outside the selected operating region.

In yet another embodiment, a computer-readable medium comprising instructions, which, when executed by a computer, cause the computer to perform operations is provided. The instructions include at least one instruction for transmitting the selected operating region for the application, and at least one instruction for receiving the application and a geographic identifier associated with the application. The geographic identifier is configured to identify the selected operating region wherein the application will operate on the device. The instructions also include at least one instruction for transmitting a request to execute the application on the device. The request includes the geographic identifier. The instructions also include at least one instruction for receiving a code which prevents an execution of the application on the device if the code is defined as a disable code. The disable code indicates that the device is operating outside the selected operating region.

In still another embodiment, a device operable to protect an application from unauthorized operation is provided. The application will fail to operate on the device when the device is defined outside a selected operating region. The device includes means for transmitting the selected operating region for the application, and means for receiving the application and a geographic identifier associated with the application. The geographic identifier is configured to identify the selected operating region wherein the application will operate on the device. The device also includes means for transmitting a request to execute the application on the device. The request includes the geographic identifier. The device also includes means for receiving a code which prevents an execution of the application on the device if the code is defined as a disable code. The disable code indicates that the device is operating outside the selected operating region.

In still another embodiment, a server operable to protect an application from unauthorized operation is provided. The application will fail to operate on a device when the device is defined outside a selected operating region. The server includes logic configured to receive the selected operating region for the application, and logic configured to generate a geographic identifier based upon the selected region and the application. The geographic identifier is configured to identify the selected operating region wherein the application will operate on the device. The server further includes logic configured to transmit the application and the geographic identifier associated with the application, and logic configured to receive a request to execute the application on the device. The request includes the geographic identifier. The server further includes logic configured to determine a current location of the device and logic configured to transmit a code. If the code is a disable code, the disable code prevents an execution of the application on the device and also indicates that the current location of the device is outside the selected operating region.

In yet another embodiment, a computer-readable medium comprising instructions, which, when executed by a computer, cause the computer to perform operations is provided. The instructions include at least one instruction for receiving the selected operating region for the application, and at least one instruction for generating a geographic identifier based upon the selected region and the application. The geographic identifier is configured to identify the selected operating region wherein the application will operate on the device. The instructions also include at least one instruction for transmitting the application and the geographic identifier associated with the application and at least one instruction for receiving a request to execute the application on the device. The request includes the geographic identifier. The instructions also include at least one instruction for determining a current location of the device and at least one instruction for transmitting a code. If the code is a disable code, the disable code prevents an execution of the application on the device and also indicates that the current location of the device is outside the selected operating region.

In yet another embodiment, a method for operating a server to protect an application from unauthorized operation is provided. The application will fail to operate on a device when the device is defined outside a selected operating region. The method includes receiving the selected operating region for the application, and generating a geographic identifier based upon the selected region and the application. The geographic identifier is configured to identify the selected operating region wherein the application will operate on the device. The method also includes transmitting the application and the geographic identifier associated with the application, and receiving a request to execute the application on the device. The request includes the geographic identifier. Further included in the method is determining a current location of the device and transmitting a code. If the code is a disable code, the disable code prevents an execution of the application on the device and also indicates that the current location of the device is outside the selected operating region.

In yet another embodiment, a server operable to protect an application from unauthorized operation is provided. The application will fail to operate on a device when the device is defined outside a selected operating region. The server includes means for receiving the selected operating region for the application, and means for generating a geographic identifier based upon the selected region and the application. The geographic identifier is configured to identify the selected operating region wherein the application will operate on the device. The server also includes means for transmitting the application and the geographic identifier associated with the application and means for receiving a request to execute the application on the device. The request includes the geographic identifier. The server also includes means for determining a current location of the device and means for transmitting a code. If the code is a disable code, the disable code prevents an execution of the application on the device and also indicates that the current location of the device is outside the selected operating region. If the code is an authorization code, the authorization code allows the execution of the application on the device and also indicates that the current location of the device is within the selected operating region.

In one or more embodiments, a protection system that operates to protect content available on a data network from unauthorized acquisition, operation, and/or distribution is provided. For example, in one embodiment, an application or content distribution server (server) is able to limit the purchaser of the application or content to operation within a predefined geographic location. Once the purchaser's device is outside the predefined location, the application or content will not be accessible from the server.

In another embodiment, a method is provided for operating a protection system to protect an application from unauthorized distribution, wherein the application will fail to operate on a device that is outside a predetermined operating region. The method comprises associating a geographic identifier with the application, wherein the geographic identifier identifies the predetermined operating region and downloading the application and the geographic identifier to the device. The method also comprises receiving a request to execute the application on the device, wherein the request includes the geographic identifier, and determining a device location. The method also comprises comparing the device location with the predetermined operating region identified by the geographic identifier and preventing the application from executing when the device is outside the predetermined operating region.

In still another embodiment, an apparatus is provided that operates to protect an application from unauthorized operation, wherein the application will fail to operate on a device that is outside a predetermined operating region. The apparatus comprises a geographic database that operates to associate the application with a geographic indicator that identifies the predetermined operating region. The apparatus also comprises processing logic that operates to match a device location with the predetermined operating region identified by the geographic indicator to determine whether the device is outside the predetermined operating region, wherein if the device is outside the predetermined operating region the application is prevented from operating.

In yet another embodiment, an apparatus is provided that operates to protect an application from unauthorized operation, wherein the application will fail to operate on a device that is outside a predetermined operating region. The apparatus comprises means for associating the application with a geographic indicator that identifies the predetermined operating region and means for matching a device location with the predetermined operating region identified by the geographic indicator. The apparatus also comprises means for determining whether the device is outside the predetermined operating region and means for preventing the application from operating if the device is outside the predetermined operating region.

In still another embodiment, a computer-readable medium is provided that comprises instructions that when executed by a processor in a protection system operate to protect an application from unauthorized operation, wherein the application will fail to operate on a device that is outside a predetermined operating region. The computer-readable medium comprises instructions for associating the application with a geographic indicator that identifies the predetermined operating region and instructions for matching a device location with the predetermined operating region identified by the geographic indicator. The computer-readable medium also comprises instructions for determining whether the device is outside the predetermined operating region and instructions for preventing the application from operating if the device is outside the predetermined operating region.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a protection system that operates to protect applications and content from unauthorized acquisition and/or distribution. In one embodiment, the system operates to assign a geographic privilege to selected applications and/or content available at a content server. For example, the geographic privilege identifies a geographic boundary (or region) that is used to limit the operation of the application and/or content. The geographic boundary can define a region, country, state, city, district within a city, or any other geographic location.

In one embodiment, the content server that provides the application and/or content informs the purchaser of the application and/or content that a geographic restriction exists. The purchaser is then able to specify a geographic boundary in which that application and/or content are to be used. For example, the purchaser may select one of several predefined regions in which the application and/or content are to be used. Once the geographic privilege is associated with the application and/or content, the application and/or content will only operate within the selected region. Thus, in one embodiment, should the user attempt to run the application and/or content outside the selected region, the user is informed that the application and/or content are unavailable since the device is outside the selected region. Once the user moves the device back inside the selected region, the application and/or content become available again.

In one or more embodiments, the protection system is suitable for use with a variety of wired or wireless devices. For example, the wireless devices may be any type of wireless device, including but not limited to, a wireless telephone, a pager, a PDA, an email device, a tablet computer, or any other type of wireless device.

Figure 1:
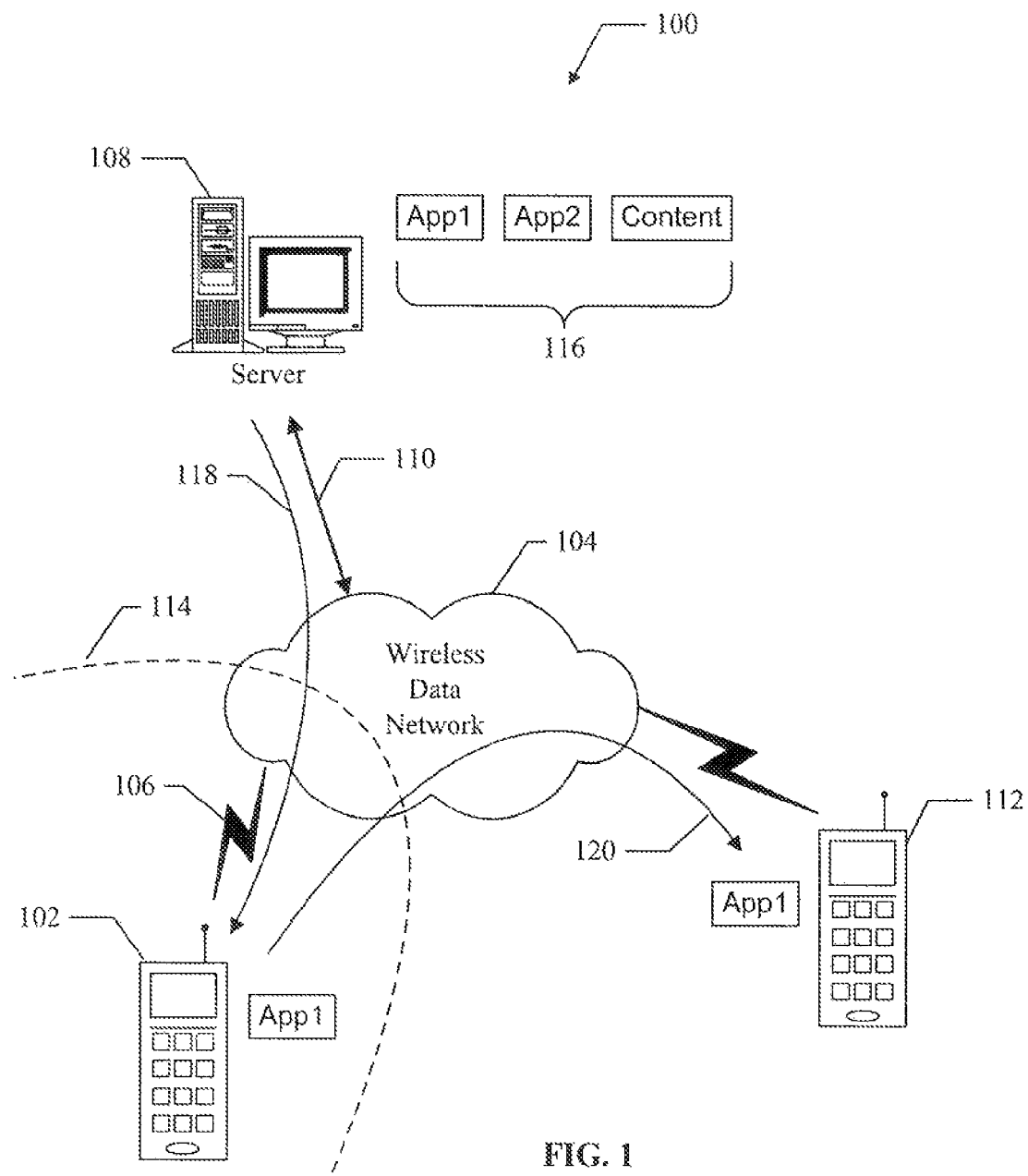
FIG. 1 shows a data network that comprises one embodiment of a protection system for protecting applications and/or content from unauthorized acquisition and/or distribution.

FIG. 1 shows a data network 100 that comprises one embodiment of a protection system for protecting applications and/or content from unauthorized acquisition and/or distribution. The network 100 comprises a wireless device 102 that communicates with a wireless data network 104 via a wireless communication channel 106. The network 100 also comprises a server 108 that operates to provide services to the wireless device 102 and other entities in communication with the network 104. The server 108 is coupled to the network 104 by link 110, which may be any type of wired or wireless link. For example, in one embodiment, the wireless device 102 may be a wireless telephone, and the server 108 may be part of a nationwide telecommunications network that provides applications and/or multimedia content to the device 102. Also coupled to the network 104 is a second wireless device 112 that is located in a different geographic from the device 102.

During operation of the protection system, content provided by the server 108 to the device 102 is protected so that the content is only accessible when the device 102 is in a selected geographic area. For example, in one embodiment, the server 108 includes various applications and content 116 that are available for download to the device 102. The device 102 contacts the server 108 and requests to download an application, for example, the application Appl. The server 108 "tags" or marks the application with a geographic indicator and transmits the application Appl to the device 102 as shown at path 118. The geographic indicator indicates that the application Appl may be operational or accessible when the device 102 is within a geographic region defined by the boundary 114. As long as the device 102 remains within the geographic region defined by the boundary 114, Appl will be accessible to the device 102. If the device 102 moves outside the bounded region, Appl will be disabled or not accessible.

If the device 102 transmits the application Appl to the device 112, for example, by transmitting the application over path 120, the application will fail to function, because device 112 is outside the region defined by the boundary 114. Thus, the protection system operates to protect applications and content from unauthorized distribution because if the application and/or content are distributed to a device outside a predefined region associated with the application and/or content, the application and/or content will fail to operate, or the application and/or content will not be accessible to the device.

Figure 2:
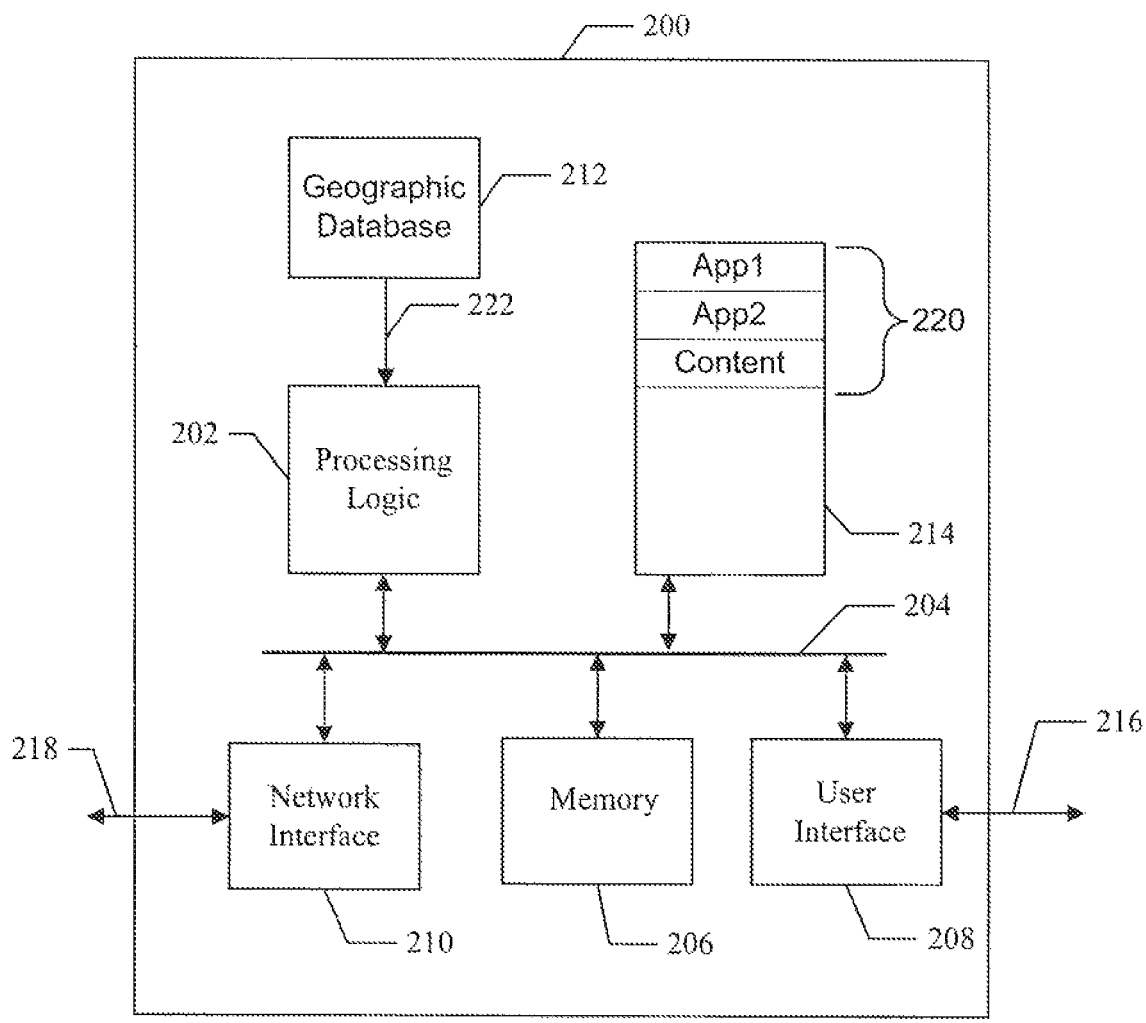
FIG. 2 shows a functional block diagram illustrating one embodiment of a protection system that operates to protect applications and/or content from unauthorized acquisition and/or distribution.

FIG. 2 shows a functional block diagram illustrating one embodiment of a protection system 200 that operates to protect applications and content from unauthorized acquisition and/or distribution. For example, the protection system 200 is suitable for use in conjunction with or as part of the server 108 to protect applications and/or content, available at the server, which are downloaded to the wireless device 102.

The protection system 200 comprises processing logic 202 that is coupled to an internal data bus 204. Also coupled to the internal data bus 204 are a memory 206, a user interface 208, and a network interface 210. The protection system 200 also comprises a geographic database 212 coupled to the processing logic 202 and an application memory 214 coupled to the internal bus 204. The application memory 214 comprises one or more applications and/or content 220 that are available for download.

In one or more embodiments, the processing logic 202 comprises a CPU, a gate array, a hardware logic, software, or a combination of hardware and software. Thus, the processing logic 202 generally comprises logic to execute machine-readable instructions.

The memory 206 comprises random access memory (RAM), read only memory (ROM), flash memory, electrically erasable read only memory (EEROM), or any other suitable type of memory, or a combination thereof. In one embodiment, the memory 206 is located internally to the protection system 200. In another embodiment, the memory 206 comprises a removable memory card or memory device that may be selectively attached to the protection system 200 and thereby being coupled to the internal bus 204. Thus, the memory 206 may comprise virtually any type of memory that is capable of storing instructions that may be executed by the processing logic 202.

The user interface 208 receives user input 216, for example, from a keypad, a pointing device, a touch pad, or any other input mechanisms which allow a user to interact with the device 102. The user interface 208 may also be coupled to a display device, such as a cathode ray tube (CRT) display, a liquid crystal display (LCD), a light emitting diode (LED), or any other type of display device to provide a visual display to the user. Any other type of input or output device may also be coupled to the user interface 208, such as, disk storage, audio logic, video devices, etc.

The network interface 210 operates to transmit and receive information between the protection system 200 and external devices, systems, and/or networks using the communication link 218. For example, in one embodiment, the network interface 210 comprises a radio transceiver circuit (not shown) that operates to transmit and receive information over a wireless data network using the communication link 218. For example, the communication link 218 may be the communication link 106 shown in FIG. 1. For example, the transceiver comprises circuitry that modulates information received from the processing logic 202 and converts the modulated information into high frequency signals suitable for wireless transmission. Similarly, the transceiver also comprises circuitry to convert received high frequency communication signals into signals suitable for demodulation and subsequent processing by the processing logic 202.

In another embodiment, the network interface 210 comprises a transceiver that operates to transmit and receive information over a hardwired communication link, such as a telephone line, or other type of data line, to communicate with a remote system on a public data network, such as the Internet.

In still another embodiment, the network interface 210 comprises circuitry that operates to communicate with local devices, such as a local workstation. The network interface 210 may also include circuitry (such as serial or parallel port logic) to communicate with a printer or other local computer or device, such as a floppy disk or a memory card. Thus, the network interface 210 may comprise any type of hardware, software, or combination thereof to allow the integrity system 200 to communicate with other local or remotely located devices or systems.

In one embodiment, the geographic database 212 comprises a central processing unit (CPU), a processor, logic, a memory, software, or any combination of hardware and software. The geographic database 212 is coupled to the processing logic 202 via the link 222 and operates to provide geographic indicators to the processing logic 202. The geographic indicators identify one or more geographic regions that may be associated with the applications and/or content 220. For example, the geographic indicators are used by the processing logic 202 to tag or mark an application and/or content for operation within a selected geographic region. After the application and/or content are tagged with a geographic indicator, the application and/or content is transmitted to the device 102, and as a result, the application and/or content will only operate or be accessible to the device 102 when the device is located within the selected geographic region indicated by the associated geographic indicator.

It should be noted that the configuration of the protection system 200 is just one configuration suitable for implementing one embodiment of the protection system 200. It is also possible to implement the protection system 200 using other functional elements or element configurations within the scope of the present invention.

During operation of the protection system 200, the processing logic 202 executes program instructions stored in the memory 206 to perform the functions described herein. For example, in one embodiment, the protection system 200 performs the described functions when the processing logic 202 executes program instructions stored in the memory 206. In another embodiment, the program instructions are stored on a computer-readable medium, such as a floppy disk, a compact disc (CD), a memory card, a flash memory device, a ROM, or any other type of memory device. The program instructions are loaded into the memory 206 via the network interface 210. For example, the protection system 200 may download the program instructions from the computer-readable medium into the memory 206 via the network interface 210.

Figure 3:
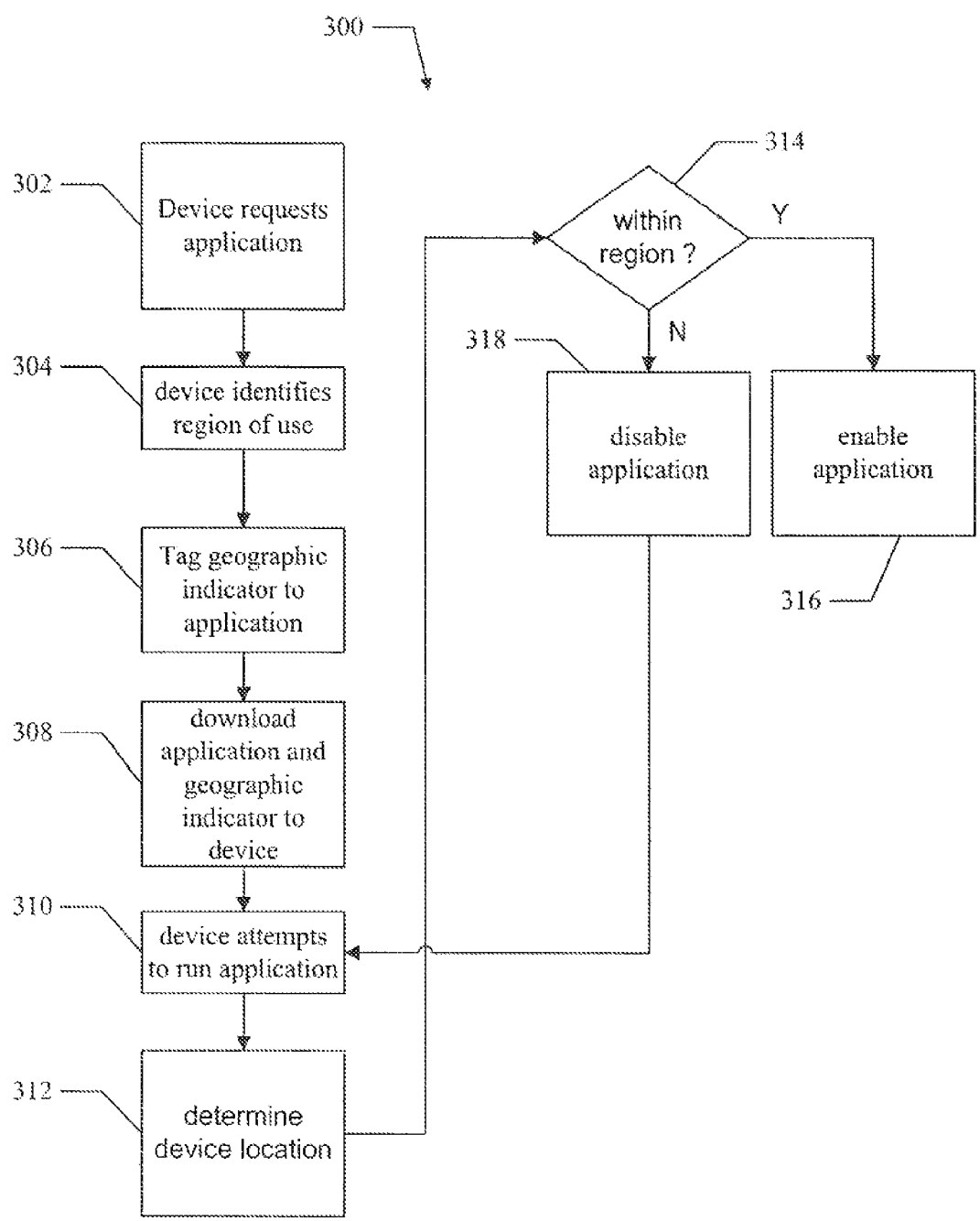
FIG. 3 shows one embodiment of a method for operating a protection system to protect applications and/or content from unauthorized acquisition and/or distribution.

FIG. 3 shows one embodiment of a method 300 for operating a protection system, for example, the protection system 200 to protect applications and/or content from unauthorized acquisition and/or distribution. For example, the method 300 will be described with reference to the protection system 200 shown in FIG. 2. It will be assumed that the protection system 200 is coupled to a data network so that the protection system 200 may communicate with a client device, for example, the device 102.

At block 302, the device sends a request to obtain an application and/or multimedia content. For example, the device 102 sends a request to the protection system 200 via the wireless network 104.

At block 304, the protection system 200 operates to query the device 102 as to what geographic area the application will be used in. In one embodiment, the device user is provided with a dialog box that allows the device user to select from a list of regions where the application may be used. For example, the protection system 200 communicates with the device 102 via the wireless network 104, and responses entered by the device user are transmitted back to the protection system 200 over the same network path.

At block 306, the protection system 200 receives the region selection from the device user and operates to tag the desired application with a geographic indicator representative of the selected region. For example, the processing logic 202 retrieves the selected application from the memory 214 and retrieves a geographic indicator from the database 212. The geographic indicator is generated based on the desired operating region provided by the device user. The processing logic 202 then tags the application with the geographic indicator. For example, in one embodiment, the geographic indicator may be a digital signature that is generated by the protection system that can be mapped to the desired operating region.

At block 308, the selected application and the geographic indicator are downloaded to the device 102. For example, the protection system downloads the tagged application to the device 102 via the wireless network 104.

At block 310, the device 102 attempts to run the application on the device 102. When the application begins executing on the device 102, the application contacts the protection system 200. For example, the application may require information and/or other content before executing on the device 102. The application contacts the protection system 200 to request the information and provides the geographic indicator that was tagged to the application.

At block 312, the protection system 200 receives the device's 102 request, and in response, the protection system 200 determines a device location. For example, in one or more embodiments, the protection system 200 determines the location of the device 102 by using a global positioning system (GPS) location, a base station location, a system identifier (SID), a network identifier (NID), an area code, or any other device location information that may be available.

At block 314, the protection system 200 performs a test to see if the location of the device 102 is within the predefined geographic location that is associated with the application the device 102 is attempting to run. For example, the protection system 200 uses the geographic indicator to determine the authorized operating region for the application. For example, the processing logic 202 uses the geographic indicator to access the database 212 to map back the authorized operating region for the application. The processing logic 202 then matches the device location and the authorized operating region to see if the device is located within the authorized region. For example, the processing logic 202 uses any type of matching technique to match the device location and the authorized operating region. If the device is within the authorized region, the method proceeds to block 316. If the device is not within the authorized region, the method proceeds to block 318.

At block 316, the protection system 200 determines that the device 102 is within the authorized geographic region, and the protection system 200 operates to allow the device to run the application. For example, in one embodiment, the protection system 200 may provide an authorization code to the application that allows the application to execute on the device 102. In another embodiment, the protection system 200 may provide an authorization code to a network server that authorizes the server to provide requested services to the application. For example, the application may be a gaming application that receives real-time gaming information from the server after the server has received the authorization from the protection system 200.

At block 318, the protection system 200 determines that the device 102 is not within the authorized geographic region and therefore the protection system 200 operates to prevent the application from executing on the device 102. For example, in one embodiment, the protection system 200 fails to send an authorization code, or in the alternative, sends a disable code to the application that prevents the application from executing on the device 102. In one embodiment, the protection system 200 fails to provide access to information requested by the application. For example, the protection system fails to authorize a network server to provide information to the application. Thus, if the application is a gaming program, the application will not receive the required real-time gaming information in order to execute properly on the device 102. As a result, because the device 102 is outside the authorized operating region, the application will fail to execute properly, and, therefore, the application is protected from distribution outside the authorized region.

The method 300 may optionally proceed to block 310 if the device user has moved the device 102 into the authorized region and attempts to run the application. At block 310, the process of determining if the device is with the authorized region begins again. Thus, if the device is moved back into the authorized region, the protection system will allow the application to function as designed.

Figure 4:
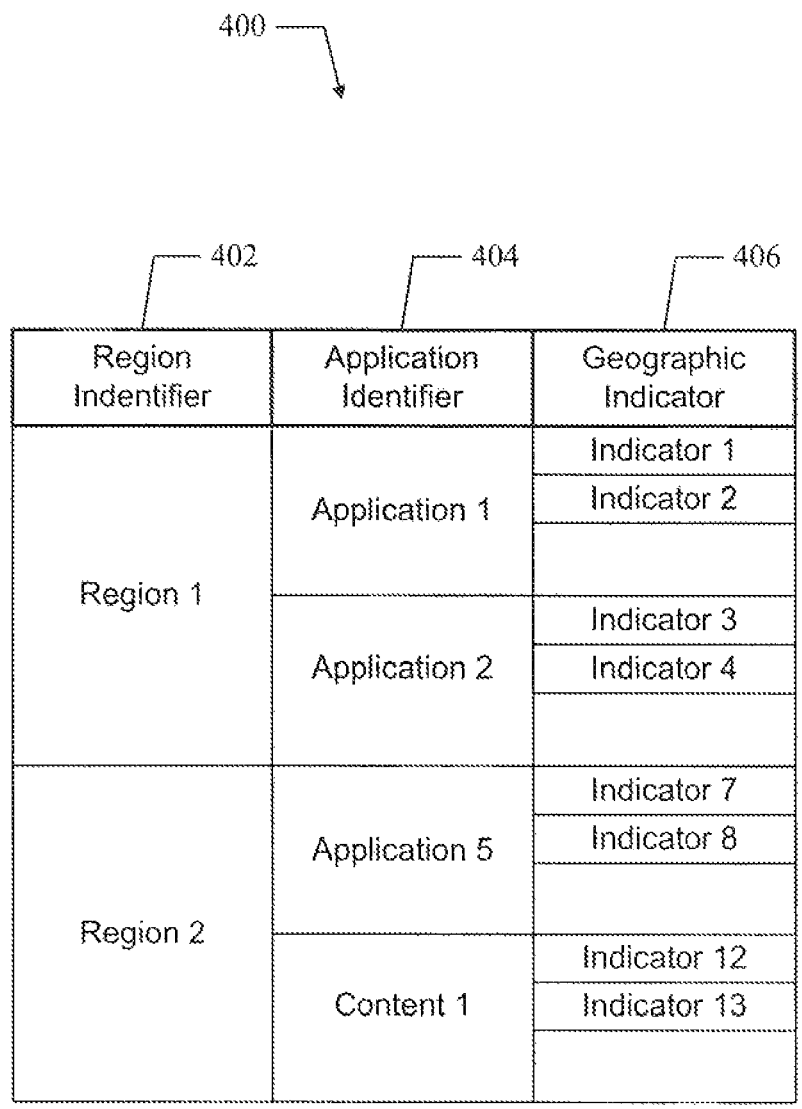
FIG. 4 shows one embodiment of a geographic database for use with the protection system of FIG. 2.

FIG. 4 shows one embodiment of a geographic database 400 for use with the protection system 200 of FIG. 2. The database 400 is used by the protection system 200 to map authorized geographic regions to applications by using a geographic indicator. The database 400 comprises a region identifier 402, an application identifier 404, and a geographic indicator 406.

The region identifier 402 identifies a region in which an application is authorized to operate. For example, the region identifier 402 may define by a region, country, state, city, district within a city, or any other geographic location. The application identifier 404 identifies a particular application and/or content that is available for execution on a device 102. For example, a variety of application types may be available, such as gaming programs, news services, movie, other video content, or audio content.

The geographic indicator 406 provides a mechanism to map an application to an authorized operating region. The indicator 406 may be generated using any known technique. For example, in one embodiment, a device identifier, the application identifier, and the region identifier are used to form a digital signature that represents the geographic indicator. Any other application or device information may also be used to create the digital signature. During operation of the protection system 200, the application provides the geographic indicator to the protection system 200 when the user attempts to execute the application on the device 102. The protection system 200 then operates to generate another signature based on the device's 102 current location. If the signatures match, the protection system 200 allows the application to execute on the device.

A protection system 200 has been described that includes methods and apparatus to protect applications and/or content from unauthorized acquisition and/or distribution. The protection system 200 is suitable for use with all types of wireless devices and is especially well suited for use with mobile telephones operating on nationwide wireless telecommunication networks.

Accordingly, while one or more embodiments of methods and apparatus for a protection system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for operating a device to protect an application from unauthorized operation, wherein the application will fail to operate on the device when the device is defined outside a selected operating region, the method comprising:

receiving the application and a geographic identifier associated with the application, the geographic identifier configured to identify the selected operating region wherein the application will operate on the device;

transmitting, from the device to a server, a request to execute the application on the device, the request including the geographic identifier;

receiving, responsive to the request, a code at the device; and preventing an execution of the application on the device if the code is defined as a disable code, the disable code indicating that the device is operating outside the selected operating region.

2. The method of claim 1, further comprising:

allowing the execution of the application on the device if the code is an authorization code, the authorization code indicating that the device is operating inside the selected operating region.

3. The method of claim 2, further comprising:

allowing the application to receive services if the code is the authorization code.

4. The method of claim 1, wherein the preventing the execution of the application on the device comprises:

preventing the application from accessing information on the server.

5. The method of claim 1, wherein a digital signature is generated for the geographic identifier.

6. The method of claim 1, wherein the selected operating region is selected by a purchaser of the application.

7. A device operable to protect an application from unauthorized operation, wherein the application will fail to operate on the device when the device is defined outside a selected operating region, the device comprising:

logic configured to receive the application and a geographic identifier associated with the application, the geographic identifier configured to identify the selected operating region wherein the application will operate on the device;

logic configured to transmit, from the device to a server, a request to execute the application on the device, wherein the request includes the geographic identifier;

logic configured to receive, responsive to the request, a code at the device; and logic configured to prevent an execution of the application on the device if the code is a disable code, wherein the disable code indicates that the device is operating outside the selected operating region.

8. The device of claim 7, the device further comprising:

logic configured to allow the execution of the application on the device if the code is an authorization code, wherein the authorization code indicates that the device is operating inside the selected operating region.

9. The device of claim 7, wherein a digital signature is generated for the geographic identifier.

10. A non-transitory computer-readable storage medium comprising instructions, which, when executed by a computer, cause the computer to perform operations, the instructions comprising:

at least one instruction for receiving an application and a geographic identifier associated with the application, the geographic identifier configured to identify the selected operating region wherein the application will operate on the device;

at least one instruction for transmitting, from the device to a server, a request to execute the application on the device, the request including the geographic identifier;

at least one instruction for receiving, responsive to the request, a code at the device; and at least one instruction for preventing an execution of the application on the device if the code is defined as a disable code, the disable code indicating that the device is operating outside the selected operating region.

11. The non-transitory computer-readable storage medium of claim 10, further comprising:

at least one instruction for allowing the execution of the application on the device if the code is an authorization code, the authorization code indicating that the device is operating inside the selected operating region.

12. The non-transitory computer-readable storage medium of claim 10, wherein the at least one instruction for preventing the execution of the application on the device comprises:

at least one instruction for preventing the application from accessing information on a server.

13. The non-transitory computer-readable storage medium of claim 11, further comprising:

at least one instruction for allowing the application to receive services if the code is the authorization code.

14. The non-transitory computer-readable storage medium of claim 10, wherein a digital signature is generated for the geographic identifier.

15. The non-transitory computer-readable storage medium of claim 10, wherein the selected operating region is selected by a purchaser of the application.

16. A device operable to protect an application from unauthorized operation, wherein the application will fail to operate on the device when the device is defined outside a selected operating region, the device comprising:

means for receiving the application and a geographic identifier associated with the application, the geographic identifier configured to identify the selected operating region wherein the application will operate on the device;

means for transmitting, from the device to a server, a request to execute the application on the device, the request including the geographic identifier;

means for receiving, responsive to the request, a code at the device; and means for preventing an execution of the application on the device if the code is defined as a disable code, the disable code indicating that the device is operating outside the selected operating region.

17. The device of claim 16, further comprising:

means for allowing the execution of the application on the device if the code is an authorization code, the authorization code indicating that the device is operating inside the selected operating region.

18. The device of claim 16, wherein a digital signature is generated for the geographic identifier.

19. The device of claim 16, wherein the selected operating region is selected by a purchaser of the application.

20. A server operable to protect an application from unauthorized operation, wherein the application will fail to operate on a device when the device is defined outside a selected operating region, the server comprising:

logic configured to receive the selected operating region for the application;

logic configured to generate a geographic identifier based upon the selected operating region and the application, the geographic identifier configured to identify the selected operating region wherein the application will operate on the device;

logic configured to transmit the application and the geographic identifier associated with the application;

logic configured to receive, from the device, a request to execute the application on the device, the request including the geographic identifier;
logic configured to determine a current location of the device; and
logic configured to transmit a code to the device that is configured to authorize or prevent the execution of the application on the device based on whether the current location of the device is determined to be outside of the selected operating region.

21. The server of claim 20, the server further comprising:
logic configured to allow the execution of the application on the device if the code is an authorization code, the authorization code indicating that the current location of the device is within the selected operating region.

22. The server of claim 21, wherein the code is the authorization code, the server further comprising:
logic configured to transmit services to the application.

23. The server of claim 20, wherein the code is a disable code, the server further comprising:
logic configured to prevent the device from accessing information on the server.

24. The server of claim 20, wherein a digital signature is generated for the geographic identifier.

25. The server of claim 20, wherein the selected operating region is selected by a purchaser of the application.

26. A non-transitory computer-readable storage medium comprising instructions, which, when executed by a computer, cause the computer to perform operations, the instructions comprising:
at least one instruction for receiving a selected operating region for the application;
at least one instruction for generating a geographic identifier based upon the selected operating region and the application, the geographic identifier configured to identify the selected operating region wherein the application will operate on the device;
at least one instruction for transmitting the application and the geographic identifier associated with the application;
at least one instruction for receiving, from the device, a request to execute the application on the device, the request including the geographic identifier;
at least one instruction for determining a current location of the device; and
at least one instruction for transmitting a code to the device that is configured to authorize or prevent the execution of the application on the device based on whether the current location of the device is determined to be outside of the selected operating region.

27. The non-transitory computer-readable storage medium of claim 26, further comprising:
at least one instruction for allowing the execution of the application on the device if the code is an authorization code, the authorization code indicating that the current location of the device is within the selected operating region.

28. The non-transitory computer-readable storage medium of claim 27, further comprising:
at least one instruction for transmitting services to the application.

29. The non-transitory computer-readable storage medium of claim 26, further comprising:
at least one instruction for preventing the application from accessing information on the server.

30. The non-transitory computer-readable storage medium of claim 26, wherein a digital signature is generated for the geographic identifier.

31. The non-transitory computer-readable storage medium of claim 26, wherein the selected operating region is selected by a purchaser of the application.

32. A method for operating a server to protect an application from unauthorized operation, wherein the application will fail to operate on a device when the device is defined outside a selected operating region, the method comprising:
receiving the selected operating region for the application;
generating a geographic identifier based upon the selected operating region and the application, the geographic identifier configured to identify the selected operating region wherein the application will operate on the device;
transmitting the application and the geographic identifier associated with the application;
receiving, from the device, a request to execute the application on the device, the request including the geographic identifier;
determining a current location of the device; and
transmitting a code to the device that is configured to authorize or prevent the execution of the application on the device based on whether the current location of the device is determined to be outside of the selected operating region.

33. The method of claim 32, further comprising:
allowing the execution of the application on the device if the code is an authorization code, the authorization code indicating that the current location of the device is within the selected operating region.

34. The method of claim 32, wherein a digital signature is generated for the geographic identifier.

35. The method of claim 32, wherein the selected operating region is selected by a purchaser of the application.

36. A server operable to protect an application from unauthorized operation, wherein the application will fail to operate on a device when the device is defined outside a selected operating region, the server comprising:
means for receiving the selected operating region for the application;
means for generating a geographic identifier based upon the selected operating region and the application, the geographic identifier configured to identify the selected operating region wherein the application will operate on the device;
means for transmitting the application and the geographic identifier associated with the application;
means for receiving, from the device, a request to execute the application on the device, the request including the geographic identifier;
means for determining a current location of the device; and
means for transmitting a code that is configured to authorize or prevent the execution of the application on the device based on whether the current location of the device is determined to be outside of the selected operating region.

37. The server of claim 36, wherein a digital signature is generated for the geographic identifier.

38. The server of claim 36, wherein the selected operating region is selected by a purchaser of the application.

* * * * *